(12) United States Patent
Baxter et al.

(10) Patent No.: US 7,532,542 B2
(45) Date of Patent: May 12, 2009

(54) SYSTEM AND METHOD FOR IMPROVING THE EFFICIENCY OF AN ACOUSTIC SENSOR

(75) Inventors: Kevin C. Baxter, Saugus, CA (US); Ken Fisher, North Hollywood, CA (US); Fred H. Holmes, Cleveland, OK (US)

(73) Assignee: Shotspotter, Inc., Mountain View, CA (US)

( * ) Notice: Subject to any disclaimer, the term of this patent is extended or adjusted under 35 U.S.C. 154(b) by 204 days.

(21) Appl. No.: 11/040,823

(22) Filed: Jan. 21, 2005

(65) Prior Publication Data

US 2008/0130414 A1 Jun. 5, 2008

Related U.S. Application Data

(60) Provisional application No. 60/481,921, filed on Jan. 20, 2004.

(51) Int. Cl.
*G01S 3/80* (2006.01)
(52) U.S. Cl. ...................................... 367/127
(58) Field of Classification Search .............. 367/128, 367/127
See application file for complete search history.

(56) References Cited

U.S. PATENT DOCUMENTS 5,973,998 A 10/1999 Showen
6,178,141 B1 * 1/2001 Duckworth et al. ......... 367/127
6,847,587 B2 * 1/2005 Patterson et al. ............ 367/127
7,139,222 B1 * 11/2006 Baxter et al. ................ 367/127
2002/0067661 A1 * 6/2002 Huntress ..................... 367/136
2004/0100868 A1 * 5/2004 Patterson et al. ............ 367/127
2005/0001602 A1 * 1/2005 Umminger et al. .......... 323/282
2007/0037610 A1 * 2/2007 Logan ......................... 455/574
2008/0130414 A1 * 6/2008 Baxter et al. ................ 367/124

* cited by examiner

*Primary Examiner*—Dan Pihulic
(74) *Attorney, Agent, or Firm*—DLA Piper LLP (US)

(57) ABSTRACT

The present invention provides a system for identifying and locating an acoustic event. In a preferred embodiment a gunshot detection sensor includes an audio sensor which detects gunshots in combination with a GPS engine which provides location and timing in conjunction with a host system. This allows an acoustic sensing weapon locator which is integrated for size and portability. The inventive mobile military gunshot detector requires a battery or fuel cell at its heart to operate. By managing the power consumption, batteries can be downsized and the time between changes or recharges can be dramatically extended allowing soldiers to carry less weight and transport fewer replacement batteries into a hostile environment.

28 Claims, 4 Drawing Sheets

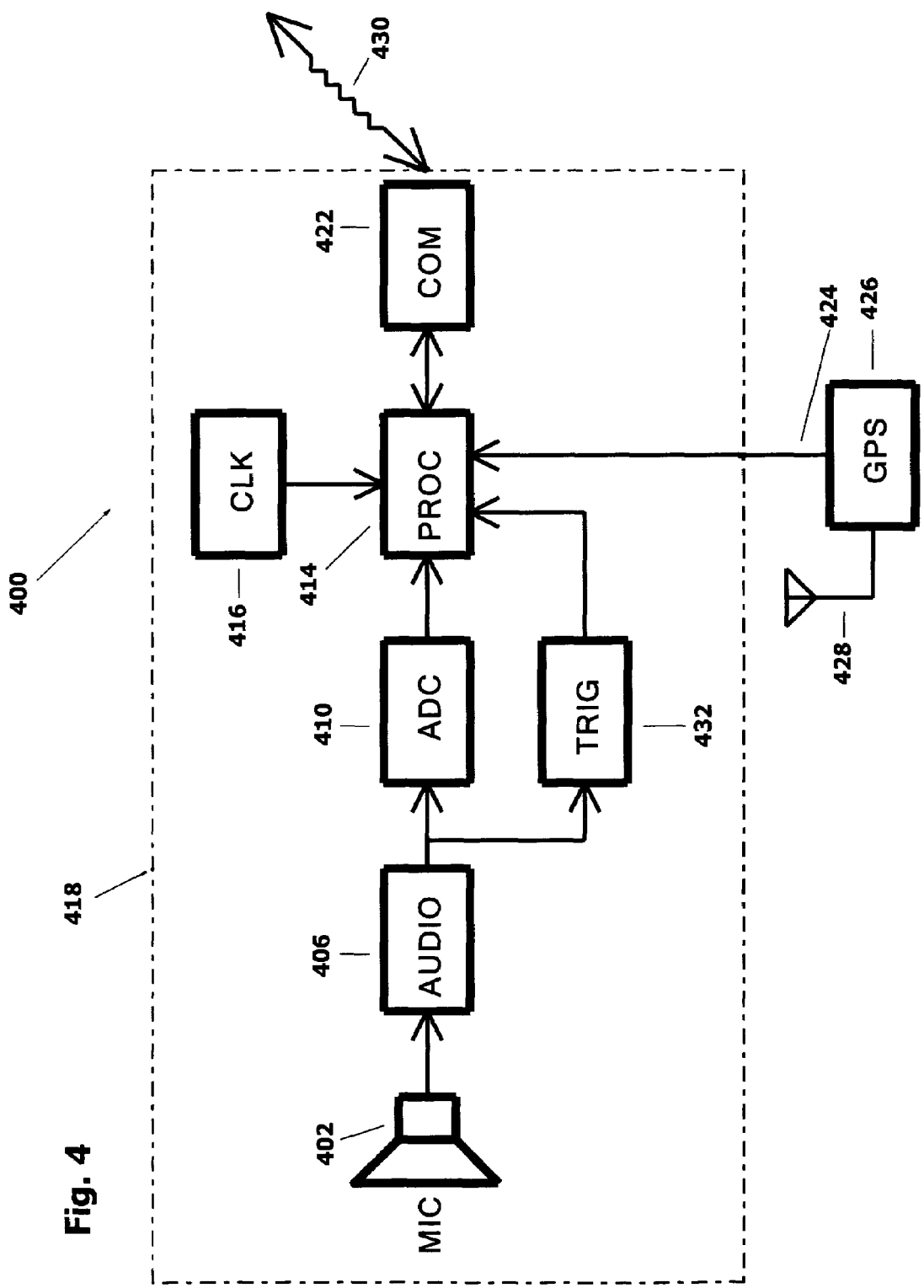

SYSTEM AND METHOD FOR IMPROVING THE EFFICIENCY OF AN ACOUSTIC SENSOR

This application hereby claims priority back to U.S. Provisional Application Ser. No. 60/481,921, filed on Jan. 20, 2004, and is hereby incorporated by reference as if set forth fully herein.

BACKGROUND OF THE INVENTION

1. Priority and Field of the Invention

The present invention relates to a system and method for detecting and locating an acoustic event. More particularly, but not by way of limitation, in a system for identifying and locating an acoustic event, the present invention provides an acoustic sensor which operated with improved electrical efficiency.

2. Background of the Invention

Gunfire and sniper detection systems are generally known in the art. Such systems can be broadly grouped into three categories: systems which pinpoint the precise location of the source of gunfire; azimuthal sensors which provide an indication of the radial direction to the source of gunfire; and proximity sensors which merely provide an indication that nearby gunfire was detected. While such systems have been demonstrated to perform well in both law enforcement and military applications, the entire field is presently an emerging technology.

In many large cities, gun-related violence has become a plague of epidemic proportions. Urban gunfire, whether crime-related or celebratory in nature, results in thousands of deaths per year in the United States alone. Gunfire location systems, such as those installed in the Redwood City, Calif., Glendale, Ariz., Willowbrook, Calif., City of Industry, Calif., and Charleston, S.C. areas, have proven to be effective in reducing law enforcement response time to detected gunfire, apprehending criminals, collecting evidence, and reducing the occurrence of celebratory gunfire. One such system is described in U.S. Pat. No. 5,973,998, issued to Showen, et al., which is incorporated herein by reference.

Showen, et al. discloses a system wherein sensors are placed at a density of roughly six to ten sensors per square mile. Audio information is sent to a computer at a central location and processed to: detect a gunshot; determine a time of arrival for the gunshot at each sensor; and calculate a location of the shooter from the differences in the times of arrival at three or more sensors. Showen, et al. takes advantage of the long propagation distance of gunfire to place sensors in a relatively sparse array so that only a few of the sensors can detect the gunfire. This permits the processor to ignore impulsive events which only reach one sensor—a concept called "spatial filtering." This concept of spatial filtering radically reduces the sensor density compared to predecessor systems, which require as many as 80 sensors per square mile.

Another gunshot location system is described in co-pending U.S. patent application Ser. No. 10/248,511 by Patterson, et al., filed Jan. 24, 2003, nw U.S. Pat. No. 6,847,587 which is incorporated herein by reference. Patterson, et al., discloses a system wherein audio information is processed within each sensor to detect a gunshot and determine a time of arrival at the sensor. Time of arrival information, as determined from a synchronized clock, is then transmitted wirelessly by each sensor to a computer at a centralized location where a location of the shooter is calculated in the same manner as in the Showen, et al. system.

As yet, azimuthal systems have not been as widely accepted as, for example, the Showen, et al. system. Azimuthal sensors typically employ one or more closely-spaced sensors, where each sensor includes several microphones arranged in a small geometric array. A radial direction can be determined by measuring the differences in arrival times at the various microphones at a particular sensor. Presently such systems suffer from somewhat limited accuracy in the determination of the radial angle, which in turn, translates into significant errors in the positional accuracy when a location is found by finding the intersection of two or more radial lines, from corresponding sensors, directed toward the shooter. Since errors in the radial angle result in ever increasing positional error as the distance from the sensor to the source increases, the reported position will be especially suspect toward the outer limits of the sensors' range.

Under certain conditions, power consumption of an acoustic sensor is of concern. For example, in a military application it may be desirable to provide a soldier-worn sensor to identify sniper locations. Such a sensor would obviously require a portable supply of electrical power, most likely batteries. Since size and weight are major considerations in a wearable, or carryable, device, the electrical efficiency of the sensor dictates the size and weight of the required batteries.

Power consumption may be of major concern in fixed sensor as well. In general, anywhere that AC power from an electric utility is not available, the alternatives for electrical power, i.e. solar, battery, etc., dictate a need to maintain an awareness of electrical efficiency. It is known in the art to use telephone lines to return acoustic information to a host computer and to use electrical power available over the phone line to power a sensor. As will be appreciated by those skilled in the art, only a few milliamps of electrical current are available from a telephone line to power circuitry.

It is thus an object of the present invention to provide a system and method for improving the electrical efficiency of a remote acoustic gunshot detection sensor.

SUMMARY OF THE INVENTION

The present invention provides an electrically efficient sensor for identifying and locating an acoustic event and a method for reducing the power consumption in an acoustic sensor. In a preferred embodiment, the inventive sensor includes: an audio circuit for delivering acoustic signals to a processor; a global positioning system ("GPS") receiver for providing positional information and an accurate real time clock; a processor for processing acoustic signals to detect an acoustic event and determine a time of arrival; and a network interface for transmitting position and time of arrival information to a host computer. In the sensor, processor clock rates are managed, or throttled, to minimize the number of processor cycles executed per second in light of the workload.

In another preferred embodiment, the inventive sensor incorporates one or more switching regulators to reduce power consumption thus reducing losses attributable to dissipation in the regulators.

In still another preferred embodiment, the host further conserves electrical power through a series of sleep levels wherein at each level, only the circuitry needed to support active functions receives electrical power. Circuitry may be powered directly from processor digital outputs or through solid state switches, as electrical current demands dictate. Modules which provide power down, or sleep, inputs are manipulated through such inputs. Circuitry awakens on: acoustic events; inbound network traffic; or on predetermined intervals.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 4 provides a block diagram for the inventive sensor wherein each subsystem is switchable.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
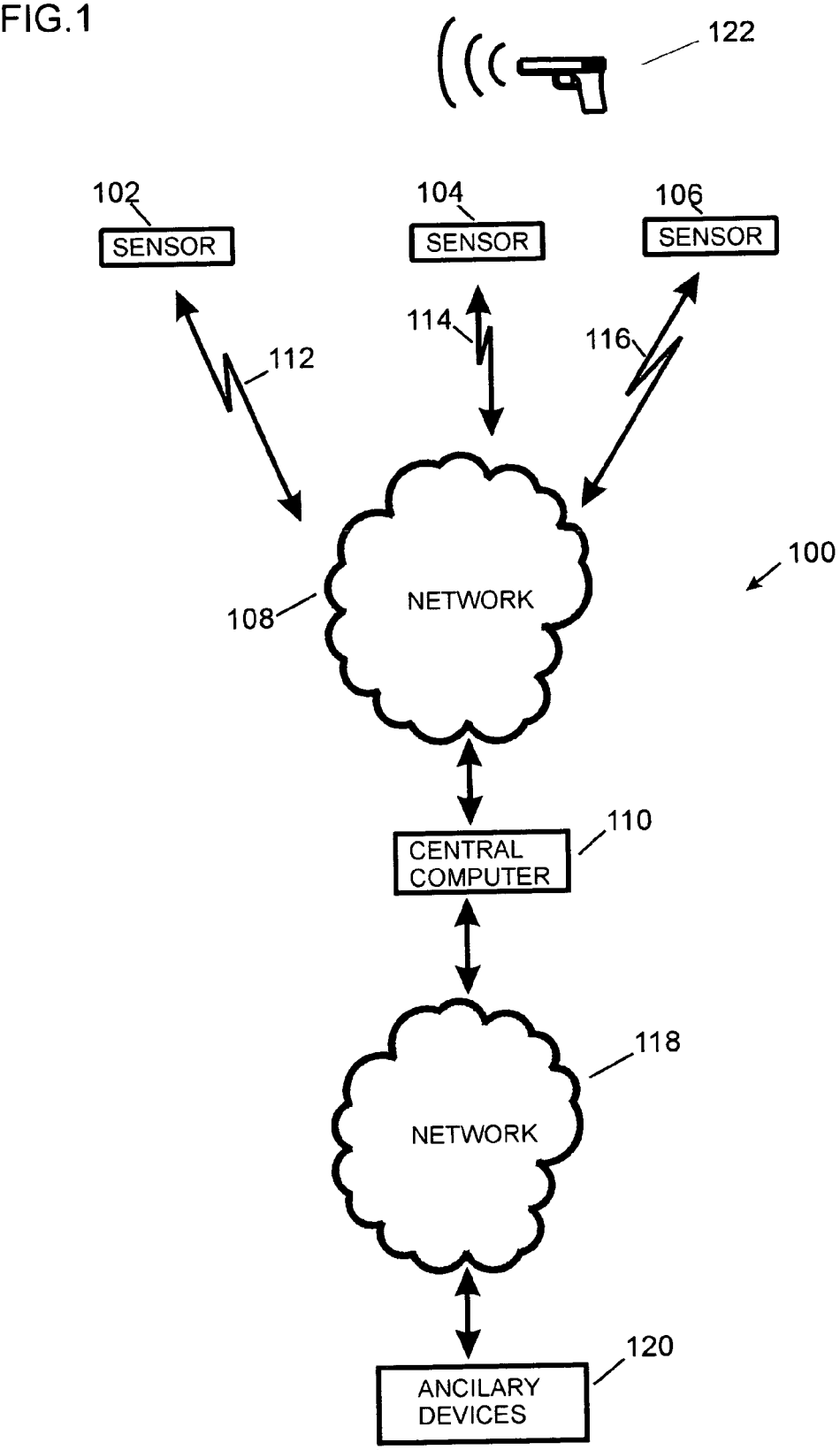
FIG. 1 depicts a preferred configuration of the inventive gunshot detection sensor in its general environment.

Referring now to the drawings, wherein like reference numerals indicate the same parts throughout the several views, a representative gunshot detection system 100 is shown in its general environment in FIG. 1. In a preferred embodiment, a plurality of sensors 102-106 are dispersed over a monitored area. Preferably, each sensor is placed such that it has a relatively unobstructed acoustic view around its immediate area. By way of example and not limitation, suitable sites include: placed atop a building; placed atop utility or light poles; on towers, etc. Typically sensors 102-106 communicate through a communication network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital signals, and that network 108 may comprise any combination of subnetworks, such as, by way of example and not limitation: a telephone network; the internet; a private computer network; a wireless network, or even a collection of dedicated wires routed to the sensor array.

It should be noted that the present invention resides in a novel combination of circuitry and software, and not in the particular detailed configuration which is the preferred embodiment. The structure, control, and arrangement of these circuits and software routines have been illustrated in the drawings by readily understandable block diagrams which show only those specific details that are pertinent to the present invention, so as not to obscure the disclosure with structural details which will be readily apparent to one of ordinary skill in the art having benefit of the disclosure herein. For the sake of clarity, individual blocks illustrate the major structural components of the inventive system as convenient functional groups.

Figure 2:
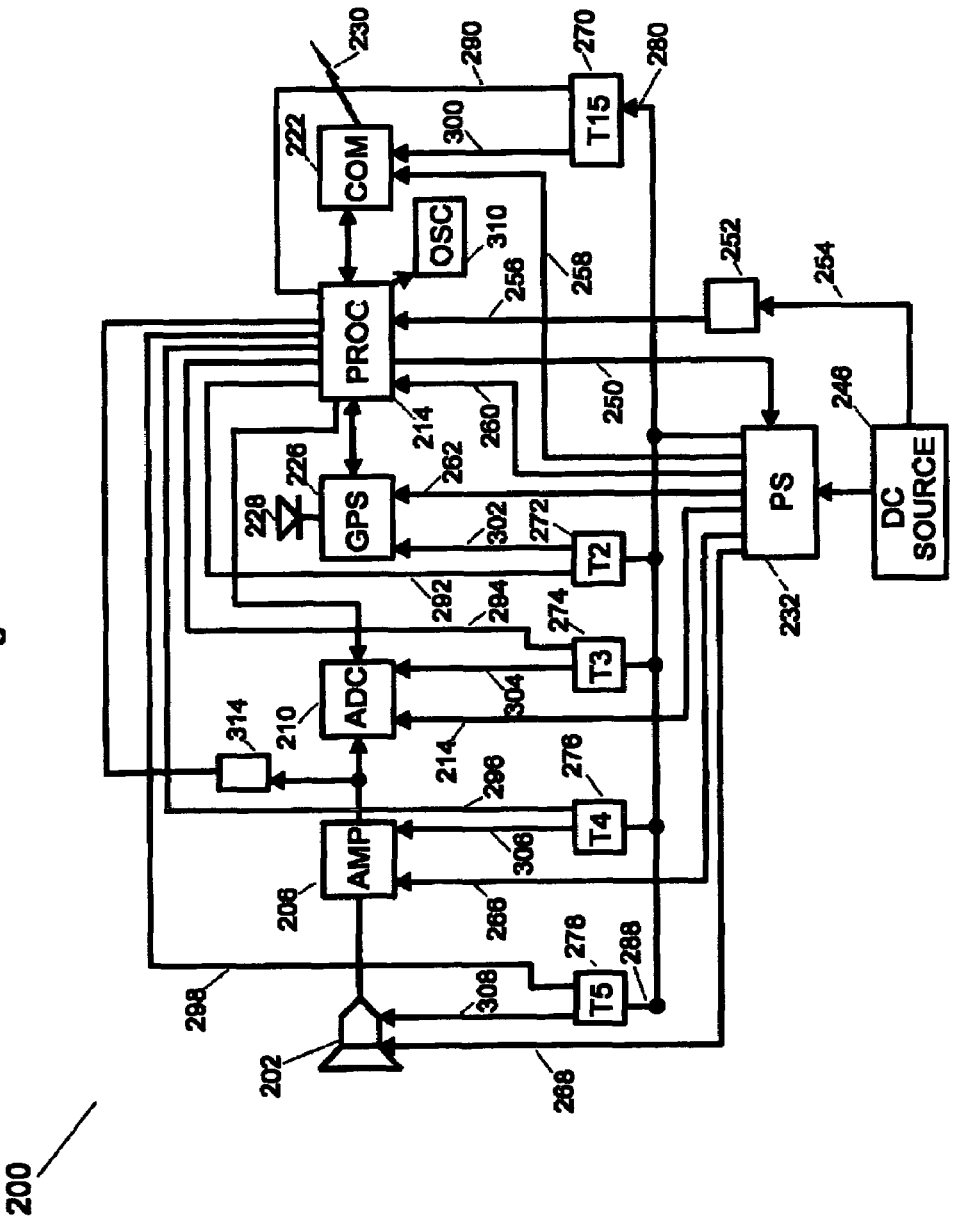
FIG. 2 provides a block diagram of the inventive sensor wherein a separate, switchable voltage regulate provide power to the GPS receiver.

With reference to FIG. 2, in a preferred embodiment, an inventive sensor 200 includes: a microphone 202 for receiving acoustic information; an amplifier 206, or other signal conditioning; an analog to digital converter 210 for converting the analog signal into its digital form; a processor for processing the acoustic signal to detect an acoustic event and determine a time of arrival for the event; a GPS receiver 226 and its associated antenna 228 for providing a sensor position and exceptionally accurate time information; and a communication interface for transmitting position information and time of arrival to a host computer. It should be noted that the communication network through which the information is transmitted may be any combination of wired or wireless connections.

In addition, sensor 200 includes a number of features for power management. Electrical power is provided by a DC source 246, whether a battery, solar panel, fuel cell, telephone line, rectified from an AC source, or the like. A power supply 232 provides continuous power on a power bus 280. It should be noted that for purposes of this disclosure, the term "bus" may encompass several different voltages, or more than one actual regulated source and separate conductors for a common voltage where current requirements require. From bus 280, switched power is provided to various parts of the circuitry of sensor 200. Thus, switch 278 selectively provides power through output 308 to microphone 202 as directed by processor output 298; switch 276 selectively provides power through output 306 to amplifier 206 as directed by processor output 296; switch 274 selectively provides power to analog to digital converter 210 through output 304 as directed by processor output 294; switch 272 selective provides power through output 302 to GPS receiver 226 as directed by processor output 292; and switch 270 provides power through output 300 to network interface 222 as directed processor output 290. Switches are preferably MOSFET devices but may be any solid state type switch such as, by way of example and not limitation, bipolar transistors, IGBT devices, solid state relays, thyristors, etc.

Although not every subsystem will likely require continuous power, sensor 200 includes a provision for keep alive circuits which either consume so little electrical power that switching is unnecessary or which require continuous operation to ensure the circuitry will be fully functional in an appropriate time frame when needed. Thus, power supply 232 provides continuous power on outputs 268, 266, 214, 262, and 258 for microphone 202, amplifier 206, A/D converter 210, GPS receiver 226, and network interface 222, respectively. It should be noted that keep alive power may be of a lower voltage than the primary power is switched under processor 214 control.

It should also be noted that continuous, or switched, power is provided to processor 214 through power supply output 260 and that individual regulators of power supply 232 may be selectively enabled or disabled through processor output 250. Further, to conserve power which would be lost through switching regulator losses, even though such regulators are normally on the order of 85%-95% efficient, power may be directed directly from DC source 246, possibly through a low quiescent current regulator 252 to processor 214. This may be particularly useful when processor 214 can operate from a wide supply range and thus avoid regulation, or when internal ram may be preserved through a low standby voltage.

In operation, with sensor 200 receiving full power, when a gunshot is received at microphone 202, the signal is amplified by amplifier 206, and converted to a digital form by A/D converter 210. Processor 214 processes the signal to detect the gunshot and determine a time of arrival using the real time feature of GPS 226. The time of arrival and sensor position are transmitted through interface 222 to network 230. During this process, oscillator 310 would likely be programmed to operate at its maximum speed. After the gunshot is processed, oscillator 310 is programmed to operate at a speed substantially less than its full speed to reduce the power consumption of processor 214.

As may be triggered by a sensor position, lack of gunshots, time of day, or other event, portions of sensor 200 may be put to sleep. For example, if GPS receiver 226 indicates that a man-wearable sensor is at a predetermined safe location, such as a police station, military headquarters, etc., the processor may direct the appropriate switches to turn off the microphone 202, amplifier 206, A/D converter 210, and GPS receiver 226. Network interface 222 may be left active so that the host computer could awaken the circuitry of sensor 200 in an emergency. Power may be reapplied to GPS receiver 226 periodically to determine if sensor 200 is removed from the safe location at which time power may be restored to all of the circuitry. While the circuitry of sensor 200 is thus asleep, processor 214 may execute a sleep instruction and awaken on periodic intervals to determine if its services are needed.

While in the field, if sensor 200 goes a long period of time without detecting any events, power may be removed from A/D converter 210 and clock oscillator 310 slowed to its lowest rate. If a loud sound is received at microphone 202, window detector 314 will detect the voltage from amplifier 206 and awaken processor 214 thorough interrupt input 316. Processor 214 can then restore the clock 310 to full speed and restore power to A/D converter 210. As will be appreciated by those skilled in the art, if processor 214 executes a sleep instruction but is programmed to awaken once per millisecond, and if processor 214 can perform its administrative duties during non-peak use in ten microseconds, its power consumption will be reduced by approximately 99%.

As will be appreciated by those skilled in the art, during a period of low activity, the GPS receiver 226 may be powered, by way of example, once per minute to determine if activity has increased. Under such conditions, and with battery backup, many GPS receivers are able to reacquire a position fix in under 10 seconds. Such operation would reduce power consumption of GPS receiver 226 by approximately 84%. It should be noted that, assuming oscillator 310 is stable and accurate to 0.05%, a readily achievable value for crystal based oscillators, processor 214 can maintain relatively accurate time in the absence of GPS receiver 226 for a sufficient period of time to still determine an accurate time of arrival if a gunshot is received during the off time of the GPS. After processing the gunshot, GPS 226 be immediately powered to determine the sensor position.

Figure 3:
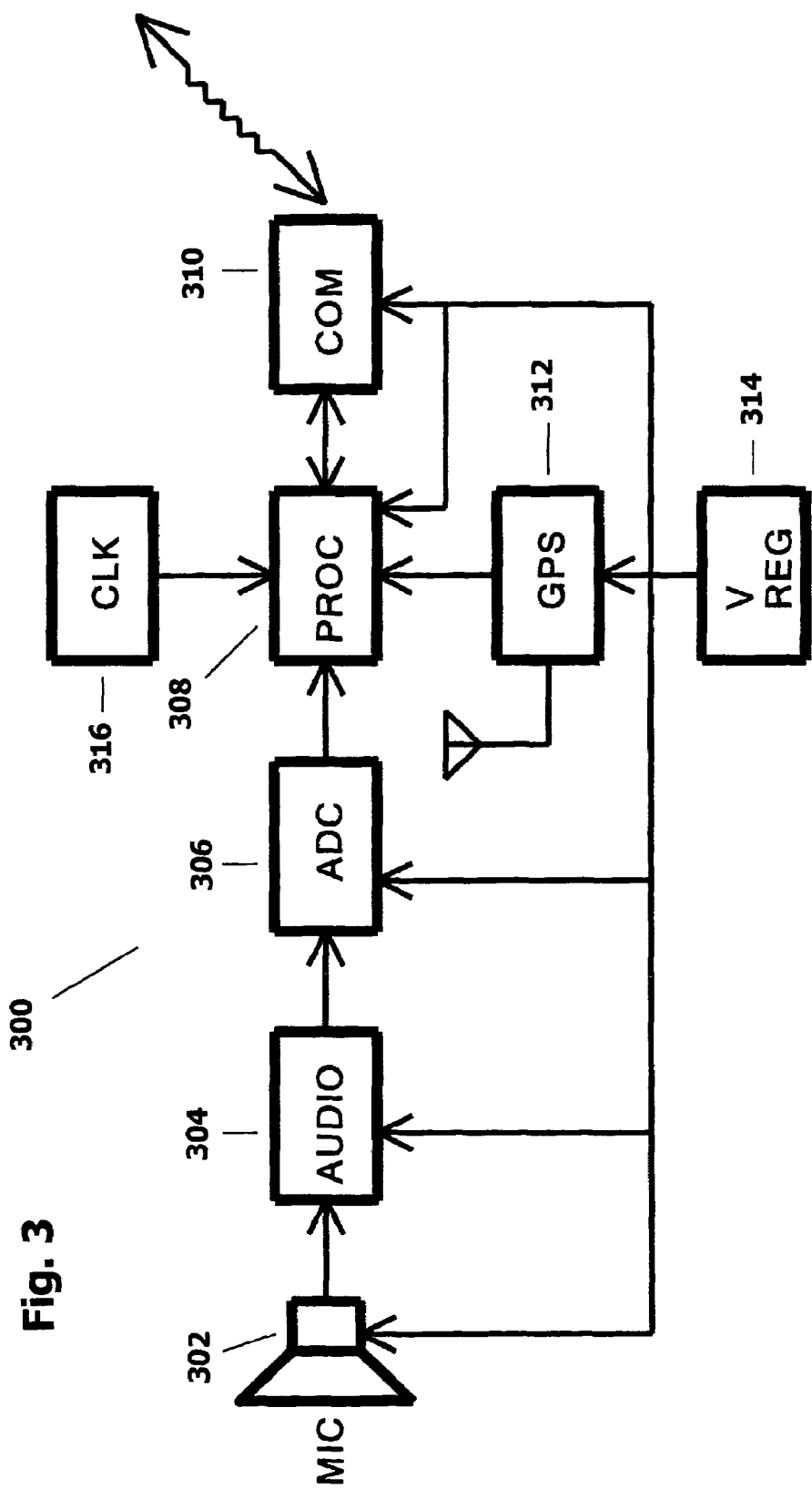
FIG. 3 provides a block diagram of the inventive sensor wherein a window comparator is used to awaken the processor upon an acoustic event of interest.

Turning to FIG. 3, not all of the features of the embodiment of FIG. 2 need to be incorporated to achieve significant improvements in power consumption. Sensor 300 comprises: microphone 302; amplifier 304; A/D converter 306; processor 308; communication interface 310; and GPS receiver 312, which process audio to detect gunshots and determine a time of arrival as discussed with reference to the previous embodiment 200. Since microphone 302 and amplifier 304 consume negligible amounts of power. In addition, GPS 312 may be put to sleep through a command issued from processor 308 and the power consumption of A/D converter 306 can be managed simply through the rate conversions are executed. Processor clock 316 can be throttled as needed for processing speed of processor 308 and regulator 315 can be of a highly efficient switching type. Under such conditions, sensor 300 can achieve substantial improvements in battery life over prior art devices.

With reference to FIG. 4, in a similar manner, significant savings can be realized with sensor 400. Again, audio is input and processed through microphone 402, amplifier 406, A/D converter 410, processor 414, and interface 422 as discussed with regard to embodiment 300. Clock 416 can be throttled to achieve maximum efficiency of processor 414, while running. In addition, processor 414 can execute a sleep instruction and be awaken by load noises as detected by window comparator 432. Another feature of sensor 400 allows for the use of an external GPS 426 located outside of a sensor housing 418. Preferably, GPS receiver 426 communicates with sensor 400 through a serial link 424.

It should be noted that, while preferred embodiments of the inventive sensor have been discussed with reference to GPS based sensors, the invention is not so limited. The techniques for conserving electrical power are applicable to all types of gunshot detection acoustic sensors and whether a GPS is employed or not.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

What is claimed is:

1. An acoustic sensor for use in a gunshot location system comprising:
   a microphone for receiving acoustic information;
   a time clock for providing absolute time values associated with the acoustic information;
   a processor in electrical communication with said microphone to process said acoustic information to detect an acoustic event and in communication with said time clock to determine a time of arrival for said acoustic event, said processor having a sleep instruction wherein upon execution of said sleep instruction said processor enters a sleep state wherein said processor consumes substantially less electrical current than when said processor is not in said state; and
   a network interface in communication with said processor to transmit said time of arrival over a communication network,
   wherein said sleep state includes reducing a processor clock rate;
   wherein, upon occurence of an acoustic event above a minimum lower threshold of a window specified by a window setting component, said processor increases the clock rate, and
   for acoustic events determined to be possible gunshots as a function of being above the minimum lower threshold:
      associates an absolute time value with the acoustic event, wherein the absolute time value is a time as to when the acoustic event was actually detected at the sensor, and
      processes the absolute time and sensor position data for transmission over the network via the network interface.

2. The sensor of claim 1 wherein said absolute time clock comprises a GPS receiver.

3. The acoustic sensor of claim 1 further comprising a GPS receiver and said GPS receiver communicates a position to said processor.

4. The acoustic sensor of claim 3 wherein said sleep instruction is triggered by arriving at a predetermined position.

5. The acoustic sensor of claim 1 wherein said sleep instruction is triggered by passage of a predetermined period of time wherein no acoustic events are detected.

6. An acoustic sensor for use in a gunshot location system comprising:
- a microphone for receiving acoustic information;
- a time clock for providing absolute time, wherein the absolute time may be associated eith the acoustic information;
- a first switch having a first switch input, said first switch having a first output responsive to said first switch input for providing electrical power to said time clock such that, when said first switch input is in a first state, said first output provides power to said time clock and when said first switch input is in a second state, said first output does not provide power to said time clock;
- a processor in electrical communication with said microphone to process said acoustic information to detect an acoustic event and in communication with said time clock to determine a time of arrival for said acoustic event, said processor having a second output in communication with said first switch to selecttively apply power to or remove power from said time clock, wherein the procesor is configured to communicate with a gunshot location system that includes time-of-arrival processing using difference in absolute times that the acoustic event is received at sensors, wherein said difference time of arrival processing is characterized by determination of a location of the acoustic event as a function of absolute times of arrival and location data received from a plurality os sensors; and
- a network interface in communication with said processor to transmit said time of arrival over a communication network,
- wherein, upon the occurrence of a first predetermined event, said processor sets said second output to remove power from said GPS receiver.
- wherein, upon occurrence of a second predetermined event, said processor sets said second output to supply power to said GPS receiver for determining an absolute time value that is transmitted in communications regarding the difference time of arrival processing, and
- wherein the absolute time value is a time as to when the acoustic event was actually detected at the sensor.

7. The acoustic sensor of claim 6 wherein said time clock comprises a GPS receiver and said GPS receiver communicates a position to said processor.

8. The acoustic sensor of claim 7 wherein said first predetermined event is arriving at a predetermined position.

9. The acoustic sensor of claim 6 wherein said first predetermined event is the passage of a predetermined period of time wherein no acoustic events are detected.

10. The acoustic sensor of claim 4 wherein accurate times of arrival can be calculated when a time signal is unavailable due to the processor being in the sleep state, wherein a relatively accurate time of arrival is obtained via times measured from an oscillator referenced against the time clock.

11. The acoustic sensor of claim 6 wherein accurate times of arrival can be calculated when a time signal is unavailable due to the processor being in the sleep state, wherein a relatively accurate time of arrival is obtained via times measured from an oscillator referenced against the time clock.

12. A method of processing sensor data associated with detection of gunshots, the method comprising:
- operating a processor within the sensor in a sleep state characterized by a reduced clock rate;
- upon occurrence of an acoustic event above a minimum lower threshold of a window specified by a window setting component:
    - increasing the clock rate;
    - for acoustic events determined to be candidate gunshots as a function of being above the minimum lower threshold:
        - associating an absolute time value from a time clock with the acoustic event, wherein the absolute time value is a time as to when the acoustic event was actually detected at the sensor, and
        - providing, via communication with a gunshot location system, the absolute time and sensor position data for use in difference time-of-arrival processing including determination of a location of the acoustic event.

13. The method of claim 12 further comprising determining the sensor position.

14. The method of claim 13 further comprising providing the GPS sensor position to the gunshot location system for use in determining the location of the acoustic event.

15. The method of claim 12 further comprising processing, at the gunshot location system, relative times of arrivals of the acoustic event to determine a location of the acoustic event.

16. The method of claim 12 further comprising entering the sleep state via a sleep instruction that is triggered by arriving at a predetermined position.

17. The method of claim 12 further comprising entering the sleep state via a sleep instruction that is triggered by passage of a predetermined period of time wherein no acoustic events are detected.

18. The method of claim 17 further comprising determining the sensor position data via a GPS receiver associated with the sensor.

19. The method of claim 17 further comprising processing, at the gunshot location system, relative times of arrivals of the acoustic event to determine a location of the acoustic event.

20. The method of claim 12 further comprising calculating accurate times of arrival when a time signal is unavailable due to the processor being in the sleep state, wherein a relatively accurate time of arrival is obtained via times measured from an oscillator referenced against the time clock.

21. The method of claim 15 further comprising determining the sensor position data via a GPS receiver associated with the sensor.

22. The method of claim 21 further comprising providing the GPS sensor position to the gunshot location system for use in determining the location of the acoustic event.

23. The method of claim 13 further comprising processing, at the gunshot location system, relative times of arrivals of the acoustic event to determine a location of the acoustic event.

24. The method of claim 13 further comprising entering the sleep state via a sleep instruction that is triggered by arriving at a predetermined position.

25. The method of claim 13 further comprising calculating accurate times of arrival when a time signal is unavailable due to the processor being in the sleep state, wherein a relatively accurate time of arrival is obtained via times measured from an oscillator referenced against the time clock.

26. The method of claim 13 further comprising entering the sleep state via a sleep instruction that is triggered by passage of a predetermined period of time wherein no acoustic events are detected.

27. The method of claim 26 further comprising determining the sensor position data via a GPS receiver associated with the sensor.

28. The method of claim 20 further comprising processing, at the gunshot location system, relative times of arrivals of the acoustic event to determine a location of the acoustic event.

* * * * *